United States Patent [19]

Rehrig

[11] 4,065,142
[45] Dec. 27, 1977

[54] CHILD SEAT FOR CART

[76] Inventor: Houston Rehrig, 1401 S. Oak Knoll Ave., Pasadena, Calif. 91109

[21] Appl. No.: 681,462

[22] Filed: Apr. 29, 1976

[51] Int. Cl.² ............................................. B62B 11/00
[52] U.S. Cl. ................................ 280/33.99 B; 297/43
[58] Field of Search .................. 280/33.99 B, 33.99 A, 280/33.99 H, 33.99 F, 33.99 R, 33.99 S; 297/43, 317, 320, 324; 220/244, 342, 343, 340

[56] References Cited

U.S. PATENT DOCUMENTS

| Re. 25,616 | 7/1964 | Stanley | 280/33.99 B |
|---|---|---|---|
| 208,343 | 9/1878 | Somers | 220/343 |
| 2,347,980 | 5/1944 | Apfelbaum | 220/343 |
| 2,997,311 | 8/1961 | Umanoff | 280/33.99 B |
| 2,998,978 | 9/1961 | Sides | 280/33.99 B |
| 3,295,714 | 1/1967 | DiAddario | 220/343 |
| 3,329,441 | 7/1967 | Mills, Jr. | 280/33.99 B |
| 3,497,234 | 2/1970 | Schray | 280/33.99 B |
| 3,964,636 | 6/1976 | Rehrig | 220/342 |

Primary Examiner—David M. Mitchell
Attorney, Agent, or Firm—Schuyler, Birch, Swindler, McKie & Beckett

[57] ABSTRACT

This child seat comprises a plastic seat panel and a plastic leg opening cover, both of which are pivotally mounted on a transverse support wire, that itself is slidably mounted upon the rear panel of the cart. The forward edge of the seat panel interlocks with the pivotable metal seat support frame. The rear edge of the seat panel is locked onto the support wire by the leg opening cover, which snaps onto the wire. The leg opening cover has recesses for accommodating the support wire that have a restricted entrance portion through which the support wire must be forced.

20 Claims, 7 Drawing Figures

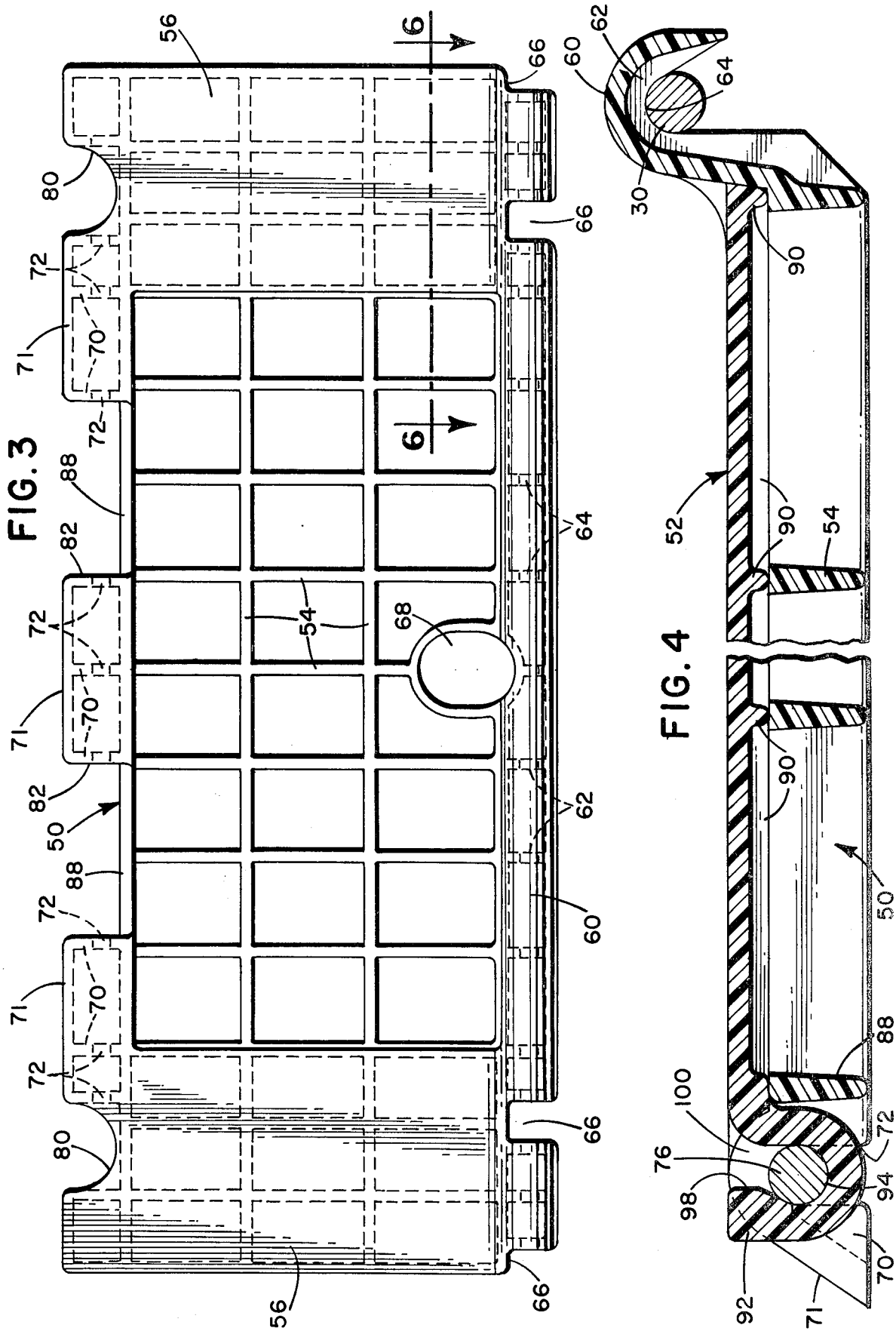

CHILD SEAT FOR CART

SUMMARY OF THE INVENTION

In recent years efforts have been made to improve carts such as those used in supermarkets. Applicant has invented a cart with a plastic basket that is a significant improvement in this area, this cart being the subject of copending application Ser. No. 588,792 filed June 20, 1975 now U.S. Pat. No. 3,999,774. The plastic basket has many advantages, as does a plastic child's seat for a cart. Chief among these advantages are light weight, attractiveness, impact resistance, ease of cleaning and elimination of rust and corrosion. Prior art child seats have had a metal frame and a plastic leg opening cover. This invention is directed to a child seat having a plastic seat panel and a plastic leg opening cover, installed and interrelated in a novel manner that enhances the construction, assembly, operation and repair of such seats.

This child seat utilizes the conventional pivoted metal seat back frame that is movable between a closed position in which it lies against the basket back panel and an open position in which the child seat is usable for a child or as an auxiliary shelf for goods. The rear panel of the cart basket is equipped with one or two leg openings for the child's legs. These leg openings must be covered when the child seat is being used to carry goods, to prevent the goods from falling out through the openings. Therefore, the leg opening cover must be movable to and from a position wherein it closes the leg openings.

The inventive child seat comprises a plastic seat panel and a plastic leg opening cover. Both are pivotally attached to a transverse support rod that in turn is slidable on runners carried by the basket rear panel. The seat panel receives this wire in several downwardly opening spaced recesses in extensions from its rear edge. The leg opening cover has extensions and recesses also, and they have entrance portions of lesser width than the diameter of the support wire, so that once installed, the wire is held in place. Those portions of the seat panel and the leg opening cover that engage the wire interdigitate with one another. The result is an interlocking relationship between the seat panel and the leg opening cover that locks both of them onto the wire against the action of forces applied to them during the various operations of the child seat.

The seat panel is of lattice construction, which provides the necessary strength, while being large part open to facilitate cleaning. All components are locked together, but can be disassembled to replace components without difficulty. In addition, no small accessory parts, such as washers, pins or the like, are necessary.

Assembly of the components is simple. The forward edge of the seat panel is in the form of a curved flange, which is held between two transverse wires on the metal seat frame. Installation to this position is accomplished simply by orienting the seat panel substantially downwardly parallel to the wire frame, inserting the curved flange portion between the wires, and then pivoting the seat panel upwardly to a substantially parallel position. The rear edge of the seat panel has extensions with downwardly oriented recesses, into which the sliding rear support wire is received. The seat panel and rear support wire are then moved upwardly until the leg opening cover can be placed in substantially 180° relationship with the seat panel. In this position, the support wire can be forced into the downwardly oriented recesses in the extensions of the leg opening cover. A thickened portion of the means defining these leg opening cover recesses is provided, which is forced between the wire and the rearmost lattice rib on the seat panel, thereby further locking the two elements together.

A full understanding of the novel concepts of this invention will be obtained from a consideration of the proferred embodiment of the invention, explained herein.

BRIEF DESCRIPTION OF THE DRAWINGS

FIG. 3 is a top view of the seat panel.

FIG. 4 is a sectional view of the seat panel and leg opening cover in the down position, taken through line 4—4 of FIG. 2.

DESCRIPTION OF THE PREFERRED EMBODIMENT

Figure 1:
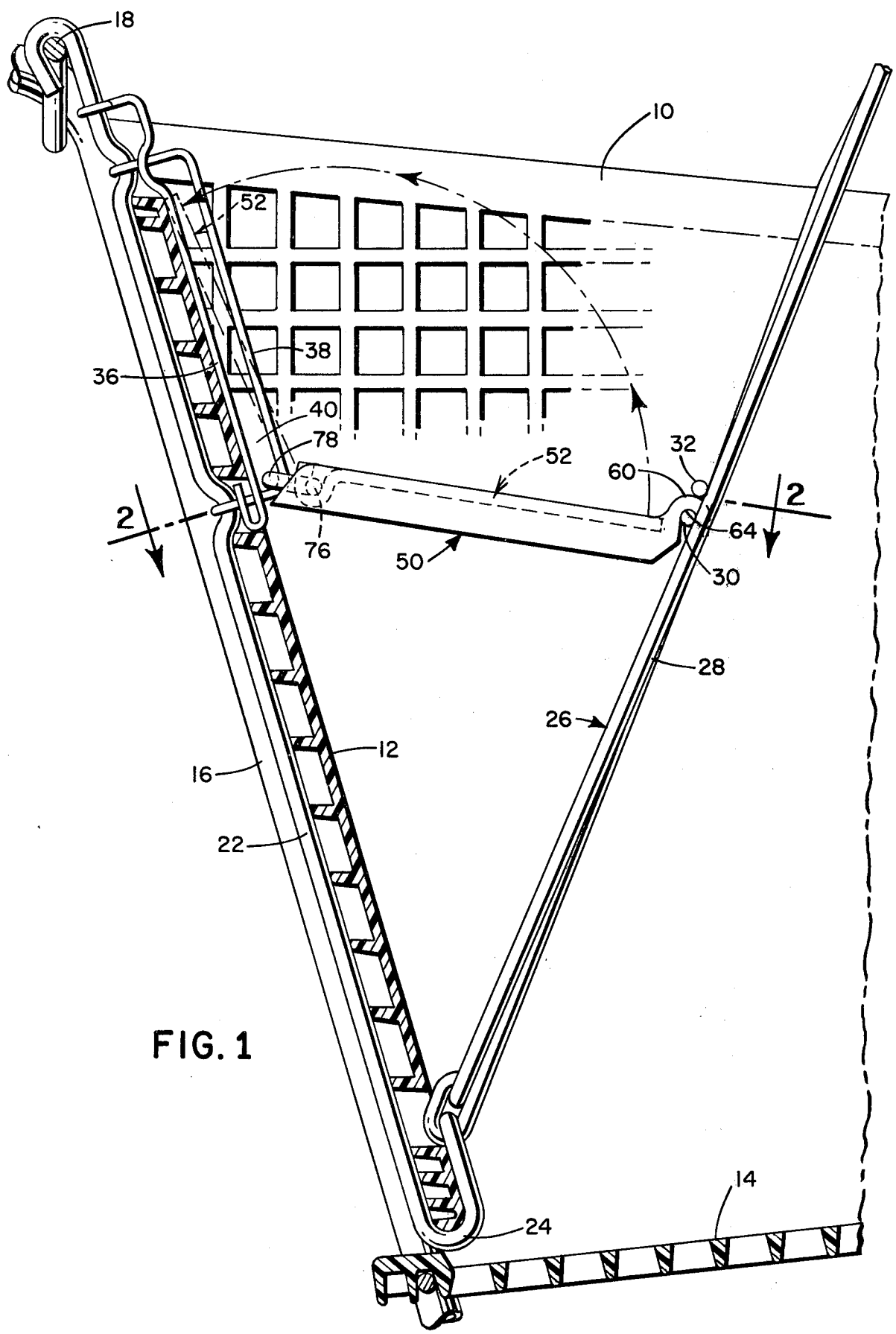
FIG. 1 is a side view, partially in section, of the inventive child seat for a cart, in the open position.

This invention is directed to a foldable child seat for a cart such as a supermarket cart. The cart comprises a side panel 10, a rear panel 12, and a bottom panel 14. Rear panel 12 is provided with two openings 15 through which the legs of a child extend when sitting in the child seat. The two upstanding rear corner posts 16 of the cart frame support a rear panel rod 18, upon which is pivotally mounted the basket rear panel 12 and the child seat. This entire unit must pivot upwardly when a plurality of baskets are nested. Basket rear panel 12 is mounted on a pair of vertical support wires 22. Each wire 22 terminates at its lower end in a U-shaped portion 24. Pivotally attached to portions 24 is a seat back frame 26, which comprises a plurality of vertical wires 28, and a pair of spaced horizontal front seat support wires 30 and 32.

The rearmost portion of the child seat slides up and down along basket rear panel 22 between open and closed positions in response to movement of seat back frame 26 between open and closed positions. To accommodate this movement an inner slide wire 36 and outer slide wire 38 are attached to each of the vertical support wires 22, defining a space 40 therebetween.

Figure 2:
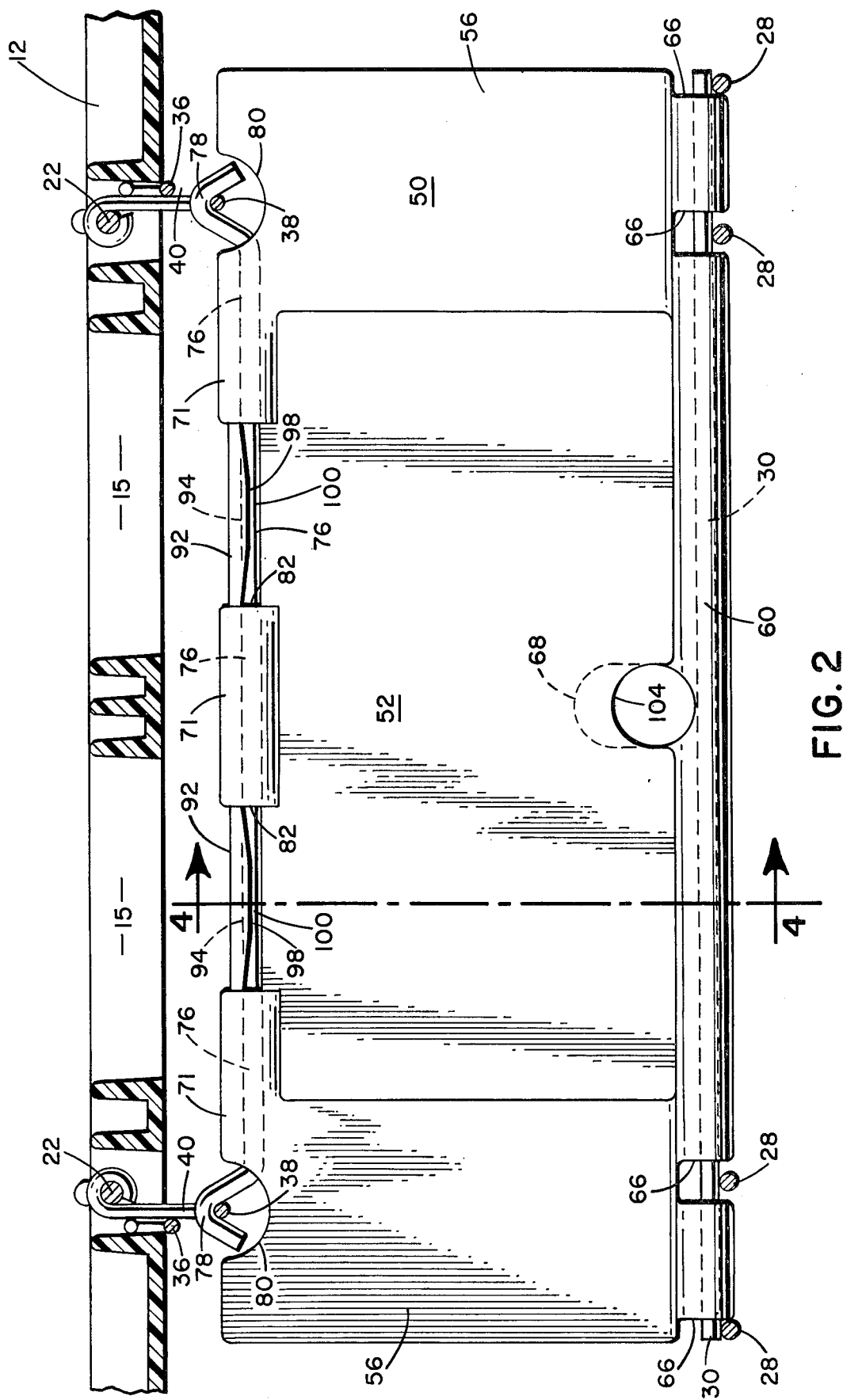
FIG. 2 is a view taken through line 2—2 of FIG. 1, with the leg opening cover in the down position.
Figure 5:
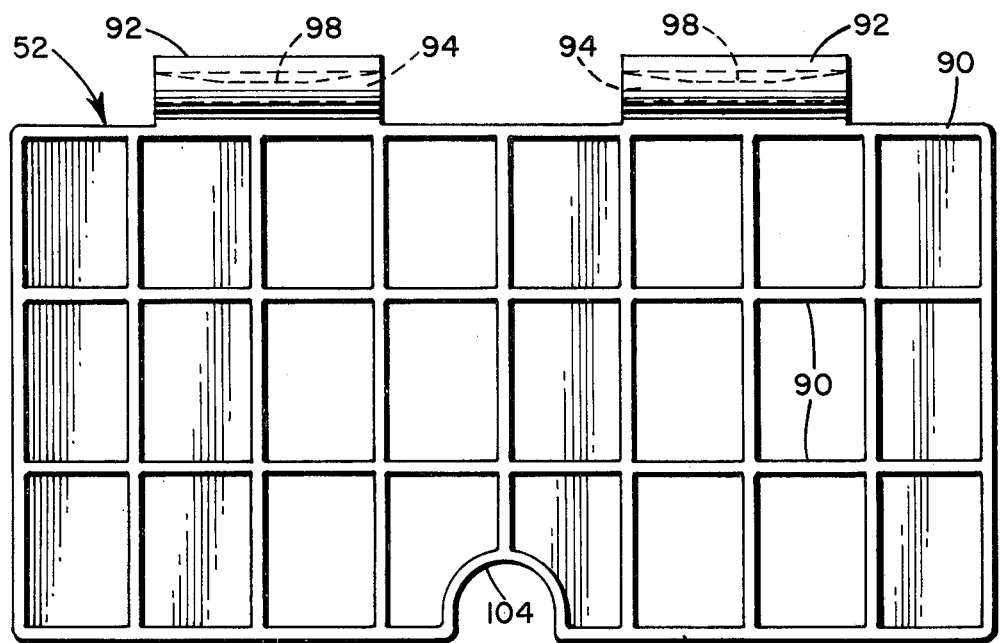
FIG. 5 is a bottom view of the leg opening cover.
Figure 6:
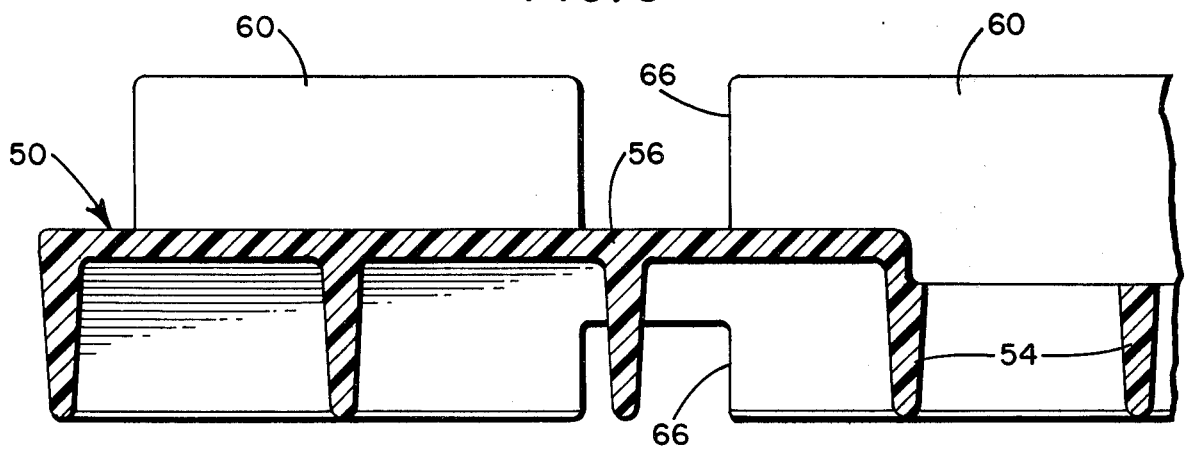
FIG. 6 is a sectional view of a portion of the seat panel, taken through line 6—6 of FIG. 3.

As best shown in FIGS. 2 and 4, the child seat comprises a seat panel 50 and a leg opening cover 52. Seat panel 50 comprises a latticework frame 54 (FIG. 3) which is open in its center portion but advantageously supports a pair of flanking top surface portions 56. The top plane of the open center portion is recessed from the top plane of surface portions 56 to accommodate the thickness of leg opening cover 52, when it is in its horizontal position. The forward edge of base panel 50 terminates in an upstanding curved flange portion 60 inside of which are a plurality of ribs 62, each of which define a downwardly opening recess 64. Flange portion 60 is broken by openings 66, which accommodate vertical wires 28. Front seat support wire 30 is received in recesses 62, to support the forward edge of seat panel 50. Adjacent to this forward edge is a finger opening 68, which facilitates movement of the leg opening cover from its horizontal position to its upstanding position.

Figure 7:
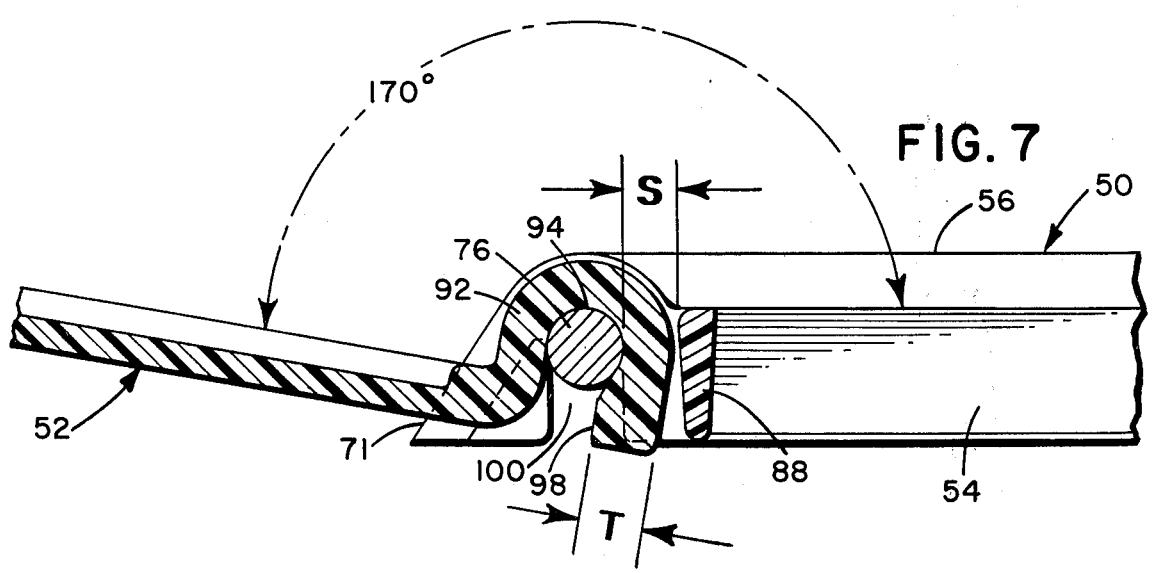
FIG. 7 is a sectional view showing the relationship of the rear edge of the seat panel, the rear seat support wire, and the leg opening cover during installation.

At the rear edge of base panel 50 there are a number of extensions 71, within each of which are a plurality of ribs 70, which define downwardly opening recesses 72. A rear support wire 76 terminates at each end in hooked sections 78, which are disposed between slide wires 36 and 38. Rear support wire 76 is accommodated in recesses 72, to support the rear edge of seat panel 50. A pair of cut-out portions 80 accommodate slide wires 38. Extensions 71 define recessed portions 80 which receive the two hinge portions of leg opening cover 52, so that there is, at that location, an interdigitating relationship between the rear edge of seat panel 50 and the lower edge of leg opening cover 52. The inner edge of recessed portions 80 is defined by a lateral lattice rib 88, which has an important function, also as will be explained below. The distance between rib 88 and the surface of rear support wire 76 is designated as S in FIG. 7. Leg opening cover 52 has a plurality of lateral strengthening ribs 90 on its underside, but is otherwise substantially planar. A pair of hinge extensions 92 extend from the rear edge of cover 52. A recess 94 traverses the underside of each hinge extension 72, for receiving rear support wire 76. The center portion of the free end of each hinge extension 92 is thickened at 98, so that the width of the passageway 100 defined thereby is less than the diameter of wire 76. Thereby, wire 76 must be forced into recess 94 and, once installed, it is retained therein. Furthermore, the thickness of the thickened portion 98 (designated as T in FIG. 7) is greater than the distance S between wire 76 and rear rib 88, so that rear rib 88 must be deformed inwardly to install leg opening cover 52. Leg opening cover 52 also has a finger opening 104 that is smaller than but aligned with opening 68. Leg opening cover 52 is of lesser width than seat panel 50, fitting into a recess in the center portion of panel 50.

The relationship between the various components is unique, permitting the components themselves to be of simple structure, eliminating the necessity for extra fittings to hold the various components together, providing for easy assembly and replacement of parts, and locking the components together so that they move with respect to one another easily and without binding. In this regard, flange portion 60 of seat panel 50 is held between front support wires 30 and 32. This allows the necessary pivotable movement of seat panel 50 with respect to seat frame 26, as frame 26 is moved between open and closed positions, yet necessitates no use of locking devices or bending closed of wire loops, etc. Rear support wire 76 is received in downwardly opening recesses 72 in the rear edge of seat panel 50. Seat panel 50 is locked into place only when leg opening cover 52 is thereafter installed upon wire 76. Once installed, leg opening cover 52 thus holds the rear edge of seat panel 50 in place during all facets of operation of the seat. When the seat frame is pushed from its open to its closed position, whether leg cover 52 is up or down, considerable forces are exerted through seat panel 50 and against rear support wire 76, which tend to attempt to disengage the panels from the wire. The novel design described here successfully resists these forces. Of course, in its operating position, seat panel 50 slopes slightly upwardly so that its rear edge can automatically be driven upwardly when seat frame 26 is moved toward its closed position. Leg opening cover 52 is movable between a substantially horizontal position, wherein it serves as the center surface of the seat panel, and an upstanding position, wherein it covers the leg openings in the rear panel of the cart, preventing goods placed upon the seat panel from exiting through the leg openings.

To assemble the components, base panel 50 is first oriented downwardly substantially parallel to seat frame 26, so that the free ends of curved flange 60 can be inserted between front support wires 30 and 32. Thus, seat panel 50 is pivoted upwardly to substantially a horizontal position. Rear support wire 76 is placed in position on each side between slide wires 36 and 38, and seat panel 50 is then rotated upwardly, where recesses 64 are engaged with wire 76. To install leg opening cover 52, seat panel 50 and wire 76 are moved upwardly until sufficient clearance is attained to place leg opening cover 52 in 180° relationship with seat panel 50. In this position, recesses 94 are aligned with wire 76 and wire 76 is forced into the recesses. In the course of accomplishing this, enlarged portions 98 must be forced between wire 76 and rearmost rib 88 of the seat panel, which requires rib 88 to be deformed inwardly. Once installed, leg opening cover 52 will assume the position shown in FIG. 7, at about 170° to seat panel 50. This system quite effectively locks both panels onto wire 76 against the forces encountered during operation of the seat.

While modifications and variations of the above-described preferred embodiment may become evident to those skilled in the art, it should be understood that the scope of the invention is governed by the appended claims.

I claim:

1. A foldable child seat for a grocery cart or the like having a cart rear panel provided with at least one leg opening, and a pair of substantially vertically extending slide wires said child seat comprising:
   a movable seat back frame pivotally attached to said cart rear panel and movable between an open position pivoted away from said cart rear panel and a closed position adjacent to said cart rear panel,
   a plastic seat panel pivotally attached at its forward edge to said seat back frame and at its rear edge to a rear support wire, said rear support wire being slidably mounted on the slide wires provided on said cart rear panel so that said seat panel can be moved from a generally horizontal position when said seat back frame is in said open position to a generally vertical position when said seat back frame is in said closed position,
   a plastic leg opening cover pivotally attached along one edge to said rear support wire and movable when said seat back frame is in its open position between a first position in superimposed relationship with said seat panel and a second position in superimposed relationship with said cart rear panel and covering said leg openings,
   said rear edge of said seat panel comprising at least one first extension extending across less than the entire width of said seat panel and having a first recess in each said first extension for accommodating said rear support wire, said first recess opening in a first direction when said seat panel is generally horizontally oriented, said leg opening cover comprising at least one second extension at said one edge extending across less than the entire width of said leg opening cover and having a second recess in each said second extension for accommodating said rear support wire, said first and second extensions being in interdigitating relationship with one another, said second recess opening in a second direction substantially opposite to said first direction when said leg opening cover is in said first position, each one of said second recesses comprising an inner portion in which said rear support wire is accommodated and an entrance portion at least in part having a cross-sectional dimension less than the diameter of said rear support wire so that said rear support wire must be forced through said entrance portion into said inner portion and is held therein.

2. The child seat of claim 1 wherein said seat panel is inclined slightly upwardly from said forward edge toward said rear edge when said seat back frame is in said open position.

3. The child seat of claim 1 wherein said rear support wire comprises a substantially straight center portion extending across said first and second extensions and a pair of end portions flanking said center portion, each of said end portions being curved.

4. The child seat of claim 1 wherein said first direction is downwardly and said second direction is upwardly.

5. The child seat of claim 1 wherein said rear edge of said seat panel is spaced from the outer surface of said rear support wire a first distance at those points where said rear support wire is engaged by said second recesses, and wherein said first edge of said leg opening cover terminates in a flange portion defining at least one side of said recess entrance portion, the thickness of at least a portion of said flange portion being greater than said first distance so that said flange portion must be forced between said rear support wire and said rear edge of said seat panel in order to place said rear support wire in said second recesses when said seat panel recesses are already engaging said rear support wire.

6. The child seat of claim 5 wherein said first direction is downwardly and said second direction is upwardly.

7. The child seat of claim 5 comprising at least two first extensions and at least two second extensions.

8. The child seat of claim 5 wherein said forward edge of said seat panel terminates in a curved flange having a substantially downwardly opening third recess for accommodating a transversely oriented front support wire carried by said seat back frame.

9. The child seat of claim 8 wherein said curved flange transcribes an arc of about 180°, and further comprising a front locking wire disposed above and parallel to said front support wire and spaced therefrom a distance substantially equal to the cross-sectional width of said curved flange.

10. The child seat of claim 9 wherein said seat panel has a central recessed portion in the upper surface thereof of width, length, and depth substantially equal to the width, length and thickness of said leg opening cover, whereby when said leg opening cover is in superimposed relation with said seat panel it is received in said central recessed portion.

11. The child seat of claim 10 wherein said seat panel is of open lattice construction at least at said central recessed portion.

12. The child seat of claim 10 wherein said seat panel is provided with a finger opening aligned with the free edge and said leg opening cover to facilitate moving said leg opening cover from said first position to said second position.

13. The child seat of claim 1 wherein said seat panel has a central recessed portion in the upper surface thereof of width, length, and depth substantially equal to the width, length and thickness of said leg opening cover, whereby when said leg opening cover is in superimposed relation with said seat panel it is received in said central recessed portion.

14. The child seat of claim 13 wherein said seat panel is of open lattice construction at least at said central recessed portion.

15. A plastic seat panel for a child seat for a grocery cart or the like wherein a seat back frame is pivotally attached to a cart rear frame and is movable between open and closed positions and wherein one of said frames supports a pair of vertically spaced horizontally oriented first seat support wires and the other of said frames supports a horizontally oriented second seat support wire, said seat panel comprising:

a frame terminating in opposed first and second edges, at least one curved hook-like flange extending outwardly from said first edge and transcribing an arc of about 180°, said flange defining a downwardly opening first recess for receiving the lowermost of the pair of first seat support wires, the thickness of said flange being substantially equal to the distance between said pair of first seat support rods along substantially the first 90° of said arc, at least one extension extending outwardly from said second edge, said extensions extending across less than the full width of said seat panel, and a downwardly opening second recess in each said extension for receiving said second seat support wire.

16. The seat panel of claim 15 further comprising a pair of solid planar top surface portions on said seat panel defining a recessed center portion.

17. A plastic leg opening cover for a child seat for a grocery cart or the like wherein a seat back frame is pivotally attached to a cart rear frame and is movable between open and closed positions and wherein said cart rear frame has at least one leg opening for a child's legs, wherein one of said frames supports a substantially horizontally oriented child seat support wire, and wherein a child seat panel is coupled to at one edge, but spaced from said seat support wire and at an opposed edge to said other frame, said leg opening cover comprising:

a cover panel having a first edge, at least one extension extending outwardly from said first edge and extending across less than the full width of said cover panel, flange means on said extension defining an upwardly opening recess comprising an inner portion for receiving said support wire and an entrance portion at least in part having a cross-sectional dimension less than the diameter of said support wire so said support wire must be forced through said entrance portion into said inner portion, at least a portion of said flange means being thickened to inhibit the passing thereof through the space between said support wire and said one edge of said seat panel also installed on said support wire.

18. A foldable child seat for use in a grocery cart or the like wherein a seat back frame is pivotally attached to a cart rear frame and is movable between open and closed positions, comprising:

a support wire attachable to one of said frames, a plastic seat panel terminating in a seat panel edge, at least one seat panel extension extending outwardly from said seat panel edge across less than the full width of said seat panel, a downwardly opening recess in each of said seat panel extensions for accommodating said support wire for pivotal movement thereon, a plastic leg opening cover terminating in a cover edge, at least one cover extension extending outwardly from said cover edge across less than the full width of said leg opening cover, said seat panel extensions and said cover extensions being so located as to be in interdigitory relationship with one another, a cover recess in each said cover extension, said cover recesses opening downwardly when said seat panel and said leg opening cover are disposed in substantially superimposed 180° relationship to one another with said edges adjacent one another, each said cover recess having an inner portion for accommodating said support wire for pivotal movement thereon, and an entrance portion at least in part of cross-sectional dimension less than the diameter of said support wire, whereby said support wire must be forced through said entrance portion into said inner portion, and means for attaching said seat panel to the other of said frames.

19. The child seat assembly of claim 18 wherein said cover recesses are defined at least in part by flange means terminating in a free end portion and wherein said free end portion is at least in part thickened to a cross-sectional dimension greater than the distance between the outer surface of said support rod and said seat panel edge at the point where said cover recesses engage said support wire, whereby said flange portion must be forced between said support rod and said seat panel edge during installation of said leg opening cover upon said support wire.

20. The child seat assembly of claim 18 wherein said seat panel comprises an open latticework frame and a pair of solid surface portions positioned thereon and defining a center portion of substantially the same width, length and depth as the width, length and thickness of said leg opening cover, whereby said leg opening cover can be accommodated in said internal portion when pivoted to superimposed relationship with said seat panel.

* * * * *